United States Patent
Scalliet

[11] Patent Number: 6,056,882
[45] Date of Patent: May 2, 2000

[54] PROCESS OF BREAKING A SLUDGE EMULSION WITH A BALL MILL FOLLOWED BY SEPARATION

[76] Inventor: Robert Scalliet, 2700 Revere, Apt. 149, Houston, Tex. 77098

[21] Appl. No.: 08/886,297

[22] Filed: Jul. 1, 1997

[51] Int. Cl.[7] .......................... B01D 17/04; B01D 17/038; B01D 21/26
[52] U.S. Cl. .......................... 210/708; 210/787; 210/800; 210/805; 208/13; 208/50
[58] Field of Search .................. 208/13, 50; 210/702, 210/704, 708, 705, 787, 800, 805

[56] References Cited

U.S. PATENT DOCUMENTS

| | | | |
|---|---|---|---|
| 3,556,204 | 1/1971 | Callahan | 361/322 |
| 3,917,564 | 11/1975 | Meyers | 208/131 |
| 4,094,770 | 6/1978 | Bose | 208/251 |
| 4,171,264 | 10/1979 | Bensen et al. | 210/708 |
| 4,260,489 | 4/1981 | Greig et al. | 210/771 |
| 4,511,461 | 4/1985 | Kruyer | 209/47 |
| 4,666,585 | 5/1987 | Figgins et al. | 208/131 |
| 4,810,393 | 3/1989 | Guinard | 210/712 |
| 4,874,505 | 10/1989 | Bartilucci et al. | 208/131 |
| 4,938,876 | 7/1990 | Ohsol | 210/208 |
| 4,985,131 | 1/1991 | Lane | 208/13 |
| 4,990,237 | 2/1991 | Heuer et al. | 208/13 |
| 5,006,239 | 4/1991 | Mishra | 210/181 |
| 5,009,767 | 4/1991 | Bartilucci et al. | 208/85 |
| 5,125,966 | 6/1992 | Siefert et al. | 75/711 |
| 5,296,040 | 3/1994 | Dybus et al. | 134/25.1 |
| 5,443,717 | 8/1995 | Scalliet et al. | 208/13 |
| 5,503,337 | 4/1996 | Kreuziger | 241/21 |

OTHER PUBLICATIONS

Frank N. Kemmer, The NALCO Water Handbook 11–1–11–13 (McGraw–Hill Book Company 1979).

*Primary Examiner*—David A. Reifsnyder
*Attorney, Agent, or Firm*—Baker & Botts, L.L.P.

[57] ABSTRACT

A process for resolving even tightly emulsified oil, water and solid emulsions by the application of a sheer force sufficient to break the emulsion. In one particular application, a tank bottom sludge produced in the petroleum industry is treated with the shear force of a bal or roller mill into the emulsion is broken. Simultaneous reduction in the particle size of the solids occurs. This process produces a commercial grade oil, water and an aqueous slurry of solids devoid of oily compounds. The oil-free solid phase produced thereby is suited for use in a coker quench stream.

33 Claims, 1 Drawing Sheet

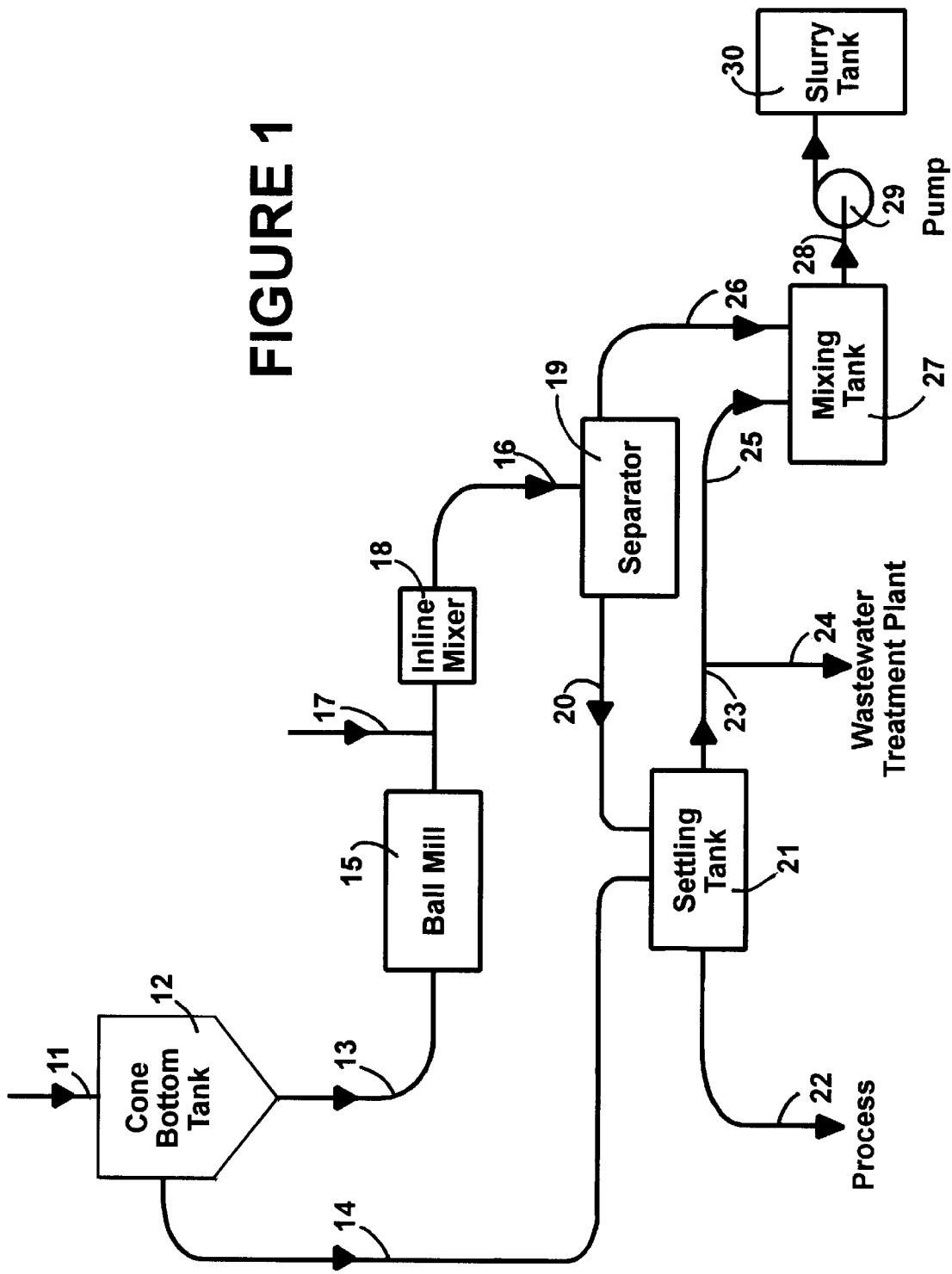

PROCESS OF BREAKING A SLUDGE EMULSION WITH A BALL MILL FOLLOWED BY SEPARATION

References cited: U.S. Pat. No. 4,810,393 by Guinard; U.S. Pat. No. 5,443,717 by Scalliet; U.S. Pat. No. 4,938,876 by Ohsol; U.S. Pat. No. 5,439,489 by Scalliet; U.S. Pat. No. 5,503,337 by Kreuziger; and U.S. Pat. No. 5,125,966 by Siefert.

BACKGROUND OF THE INVENTION

1. Field of Application

This invention pertains to an effective, cost efficient method of separating even tightly emulsified oily waste sludges. The method can be used in treating used liquid petroleum products, and wastes generated from petroleum production and refining facilities, manufacturing plants, chemical plants, still mill sludges, municipal facilities, etc.

2. Background

Many industrial plants and municipal facilities generate waste products that are partial emulsions of water, oil and solids and are referred to as "sludges." For example, petroleum refineries and manufacturing plants generate significant quantities of oily waste products that contain a variety of solids, such as suspended carbonaceous matter and inorganic matter such as rust scales, catalysts fines and the like. Furthermore, most of this waste is classified as hazardous and, therefore, must be treated before disposal in regulated landfills to meet concentration limits for certain organic compounds, cyanides and several heavy metals.

Refinery waste sludges are among the most difficult emulsions to break. Yet the disposal criteria for solids are expensive to reach, necessitating the separation of the water, oil and solid components to minimize the amount of wastes that require disposal. Further, the hydrocarbons can be recycled in the plant's processes and the water can be treated per normal waste water treatment processes, if sufficient amounts of solids are removed. Therefore, although refinery waste sludges are very difficult to break, it is often the most economical means of treating the waste.

In order to understand the technology used to separate waste sludges, it is useful to review the theory of emulsion. An emulsion is an intimate mixture of two immiscible liquids, such as oil and water. Two types of oil and water emulsions are commonly encountered, based on the relative amounts of oil and water. The first is an oil dispersed in water (oil in water) emulsion, and the second is a water dispersed in oil (water in oil) emulsion.

A stable oil in water emulsion consists of electrically charged oil droplets dispersed in a polar medium such as water. The violent mixing and shearing of oily wastewater in transfer pumps disperses the minute oil droplets throughout the water, and the friction between the oil and water phases creates static electrical charges at the oil and water interphase and helps to stabilize the emulsion.

This emulsion can be further stabilized by a variety of chemical and physical mechanisms. Surfactants (such as soaps, cresylates, sulfides, and electrolytes) usually carry an electric charge and travel to the oil/water interface (the interfacial film) of the droplets, thus reinforcing the repulsion of the droplets. Fine, solid particles may also stabilize an emulsion if the particles are of the correct size and abundance. The solid particles adsorb at the oil/water interface, reinforce the interfacial film and prevent the droplets from coalescing. Thus, solid particles also reinforce the stability of the dispersion.

The "breaking," or "resolution," of an oil in water emulsion is done by neutralizing the charges at the surface of the droplets. This is performed with a cationic emulsion breaker because the dielectric constants of oil and water cause the oil droplets to carry a negative charge in water. Lowering the pH, with sulfuric acid for example, can also help by converting any carboxyl ions present in the surfactant into carboxylic acid. Once the charges are neutralized, the phases can be gravity separated in an API or CPI separator. This separation can be significantly accelerated by centrifuging the mixture. Treatments to break waste sludges include also floatation, ultrafiltration, activated carbon adsorption, coalescence and solvent extraction.

Water in oil emulsions are viscous, concentrated substances formed when oil comes into contact with water and solids. Where agitation is present, the water becomes dispersed in the oil. Finely divided solids, ranging from colloidal to 100 microns, are particularly effective in stabilizing these emulsions. Other stabilizing agents include soaps, sulfonated oils, asphaltic residues waxes, salt sulfides and mercaptans.

The breaking of a water in oil emulsion can be done with physical methods such as heating and centrifugation. Chemical treatment of water in oil emulsions is directed at destabilizing the dispersed water droplets and solids or at destroying the emulsifying reagents. Usually anionic reagents are employed to destabilize the water droplets because the water droplets tend to be positively charged. Acidification may also be effective if the acid dissolves some of the solids and thus reduces the amount of stabilizing solids. Another method of treatment involves potent demulsifying agents carrying both hydrophilic and lipophilic groups. The demulsifying agent displaces the original emulsifying agent because it has more potent surface active agents. Heating reduces the viscosity of the emulsion and increases the solubility and diffusion of the demulsifying agent in the emulsion. Usually, thorough mixing and heat are both necessary to help disperse the demulsifying agents in the emulsion and to facilitate the separation of the phases once the charges are neutralized. Here again, centrifugation is the key to accelerating the separation.

Current Practices of Refinery Waste Emulsion Resolution

The emulsions encountered in refinery waste are very diverse because the waste itself is a very heterogeneous material coming from many different processes. Therefore, the separation of refinery waste into its constituents is a very tricky operation, far removed from the cleanliness of the theoretical resolutions described above. The state of the art includes multiple technologies, all attempting to enhance the efficiency of charge neutralization and the settling of the demulsified residual mixture. Myriads of chemical formulations have been created for breaking emulsions, showing by their number and diversity that there is no magic potion that can universally break refinery waste sludges.

Physical methods of resolving refinery waste sludges include sophisticated centrifuges that have been designed to apply high G forces and long residence times (a high Σ factor) (see e.g., U.S. Pat. Nos. 4,810,393; 5,443,717). In U.S. Pat. No. 5,443,717 (the '717 patent), for example, a process for producing a quench stream for use in the quench cycle of a delayed coking process is described. A waste stream containing water, organic compounds and solids is treated by centrifugation in a vertical disk centrifuge. After being separated from the oil and water components of the stream, the particulate matter leaves the centrifuge at a very high exit speed and the impact of the solids on the exit shield causes attrition of the particle size. This particle attrition makes the solids produced thereby particularly suitable for use in a coker quench stream.

However, this method requires the use of an expensive centrifuge with a high Σ factor and is thus economically disadvantaged, not only because of the high initial outlay for such sophisticated equipment, but also because of its maintenance costs. Further, because the inventors employed particle attrition means only after the separation of the three phases of the waste sludge, they failed to take advantage of shear forces to assist in the resolution of the emulsion. Even if the inventor had been aware of the possibility of resolving emulsions with shear force, the design of the high speed disk centrifuge would not allow the application of shear forces to the emulsion because most of the attrition of the solids due to shear is traced to the projection of solids on a shield as they exit the centrifuge bowl.

U.S. Pat. No. 4,810,393 relates to a process for the resolution of oily sludges that consists of heating the suspension at a temperature exceeding 60° C. and separating the heated suspension in the centrifuge described in the '717 patent into an aqueous phase, an oily phase and into sediments. A flocculent is added to the sediments and, while the temperature is at least 50° C., the water is squeezed out by pressing on a small mesh filter. The sediments are then eliminated either by discharging or by incineration. The heating assists in reducing the viscosity of the oil and increases the solubility and diffusion of the flocculating agent in the emulsion. This process causes particle attrition and therefore the solids can be disposed of in a coker quench stream. The method, however, employs the centrifuge described above, thus contributing to the expense of the method.

Another approach for resolving tight emulsions has been to apply pressure and heat in a pressure cooker. For example, U.S. Pat. No. 4,938,876 describes a process for resolving emulsions by heating the mixture to at least about 115° C., rapidly cooling the mixture to below 100° C., and separating the resulting phases. Preferably, the invention includes the step of adding a flocculent prior to cooling the mixture. The expansion method of achieving rapid cooling apparently serves to break the emulsion by rupturing the microstructure of solids protecting the oil/water interface. Once the solids settle out of the emulsion, they can be separated by centrifugation, settling or filtration. This method is disadvantaged in that applying pressure to bring water to 115° C. and expanding to flash cool necessitates the use of expensive pressure vessels. Further, the efficacy of the process has not been demonstrated on a commercial scale.

Some of these methods work reasonably well to break emulsified material into its constituents and separate them. Usually, however, the solids are not completely de-oiled, making them unsuitable for recycling as a coke quench. Therefore, the solids (if hazardous) must be disposed of either as an alternate fuel for burners or industrial furnaces, or further thermally de-oiled and sent to landfills. Neither solution is as economical as recycling the solids in a coker.

Therefore, an economical, efficient means of completely resolving a wide variety of very tight waste emulsions, including refinery waste sludges, is needed.

SUMMARY OF THE INVENTION

Although it is taught that oil, solid and water mixtures can be emulsified by grinding (see e.g., U.S. Pat. No. 5,503,337) or by high shear agitation (see e.g., U.S. Pat. No. 5,125,966), by this invention it has surprisingly been discovered that the application of sufficient shear force can actually serve to break an emulsion, allowing the separation of oil, water and solids. A readily available device, the ball mill, can deliver sufficiently high shear rates to break even the tightly emulsified water in oil emulsions of the petroleum industry. A test with a ball mill was done in a laboratory on two very tight water in oil emulsions and indicated that the ball mill was more effective than traditional demulsifying agents alone in resolving refinery waste sludges. Further, the ball mill resolution was so complete that a mere table top centrifuge provided complete separation of the phases at 500 G. Thus, the technique eliminates the need for expensive centrifuges with high Σ factors and G forces of greater than 3,000 or 4,000 or more.

The process for resolving emulsions in waste sludges comprises treating a waste sludge having oil, water and solids in a tight emulsion by applying a shear force to the waste sludge. The shear force should be sufficient to break the tight emulsion and can be determined empirically. Next, the method comprises separating the oil, water and solids to produce three distinct phases. The oil phase can be recycled as commercial grade oil.

In some oily waste sludges, the oil phase contains hydrocarbons that are heavier than water and separate with the solid phase. In one modification of the method, a light oil can be added to the waste sludge to dissolve the heavy hydrocarbons, thus causing them to float, facilitating the complete de-oiling of the solids. In an alternative embodiment, a salt, such as sodium chloride, is dissolved in the emulsion to increase the density of the separated water phase. Most hydrocarbons will float above the brine, which has a density of 1.2 g/l in normal conditions. The brine can be recycled in order to minimize salt consumption.

In an alternate embodiment, the method has a particular application to a process for producing a coker quench stream from waste sludge comprising treating a waste sludge having oil, water and solids in a tight emulsion by shearing the waste sludge to break the tight emulsion; separating the oil, water and solids by gravity or centrifugation; and using the solids slurried in water as coker quench stream. As before, the oil can be recycled and heavy hydrocarbons can be separated with the aid of a light oil or salt.

In yet another embodiment, in an improved process for producing a delayed petroleum coke, wherein a coker quench stream is introduced into a delayed coking vessel during quenching, the improvement consists of treating a waste stream containing an emulsion of water, oil and solids by applying a shear force sufficient to resolve the emulsion. The resolved emulsion is separated into a separate water phase, a separate oil phase containing less than 2% BS&W and a separate solid phase containing less than 8% oil. Then the solid phase is diluted, if necessary, to be a coker quench stream having less than 20% solids and introduced into a coker quench stream during quenching.

The invention relies on the fragility of emulsions to high shear forces and employs a ball mill, roller mill, hammer mill, disk attrition mill, pebble mill, double cage disintegrator, vertical stirring or tower mill, such as those produced by SVEDALA or KUBODA, a vibrator mill, such as those produced by SVEDALA, or similar equipment (see e.g., Perry's Chemical Engineer's Handbook, Chp. 8 (6th ed. 1984)) to break the boundary layer that envelops the water droplets, allowing the droplets to coalesce and thus separate from the oil. Any device capable of applying sufficient shear force to break the emulsion, as determined empirically, will suffice. However, the relatively inexpensive ball mill, such as the SRR (solid rubber rolling) mill, manufactured by SALA, or the vertical stirring mill, also by SALA, are currently preferred. The application of shear force breaks the emulsion and simultaneously reduces the particle size of the solids. Separation of the three phases can then be economically achieved with a Cone Bottom Tank, a Corrugated Plate Interceptor or Inclined Plate Separator, or similar equipment. However, in the event that increased settling speed is desired, centrifugation with the mere Σ factor of a common decanter centrifuge is more than sufficient. If necessary, demulsifying agents and/or a flocculating agent are added to the waste before or after, preferably after, ball milling.

The process described here applies to the resolution of the waste sludges produced by the petroleum and other industries and produces constituents clean enough to be recycled. For example, the method allows the user to treat slop oils, such as tank bottoms, and extract commercial grade oils from the slop oils. It also allows the user to dispose of the solid constituents of a hazardous waste stream in the quench water of a coker in such a manner that the solids are incorporated in the coke without harm to the coking process, as described in U.S. Pat. No. 5,443,717 (incorporated by reference herein). Alternatively, the solids can be used as mixed with oil and used as fuel, per U.S. Pat. No. 5,439,489 (incorporated by reference herein), or dried, thermally desorbed and disposed of in a landfill.

Waste sludges from industries other than the hydrocarbon processing industry can be treated in the described manner. For example, oil waste sludges are produced in large quantity by the basic metals industry, the automotive and machining industry, the meat and food processing industry, the textile industry and the like.

Sedimentation separates the constituents based on their apparent density. Therefore, oil constituents that are heavier than water sediment with the solids and contaminate them. In the event that a significant amount of heavy hydrocarbons are entrained with the solid phase, a modification consists of mixing the sludge with enough light oil, such as coker gas oil, to dissolve the heavy hydrocarbons and create a mixture that is lighter than water. This mixture will thereby float and separate from the solids. Alternatively, the density of the water phase can be increased with a salt, thus causing even the heavy hydrocarbons to float above the dense salt water.

Other modifications are possible, depending on the exact waste sludges to be treated. For example, it is sometimes necessary to add reagents, such as emulsion breakers, including but not limited to, polyvalent metal salts, mineral acids, adsorbents, polyamines and polyacrylates and their derivatives, alkyl substituted benzene sulfonic acids, alkyl phenolic resins and their derivatives, substituted polyalcohols, and the like. Likewise, the processes described herein can be combined with other processes and techniques of waste treatment and recycling known in the art. Indeed, because the treatment of tightly emulsified oily waste sludges should be optimized according to the sludge content, each treatment regime will likely comprise a unique combination of the steps described herein and the known prior art steps.

DETAILED DESCRIPTION OF THE INVENTION

As used herein, "oil" comprises any oily or greasy material that is generally immiscible with water. In particular, oil can be the hydrocarbons that constitute the oily part of refinery waste.

As used herein, "solids" are organic or inorganic particulate matter, such as components of the refinery soil, some carbonaceous materials, rust scales, catalyst fines, etc.

As used herein, "sludge" is an emulsion of oil, water and solid matter. Sludges are produced in a variety of industries, but are characterized herein as tight emulsions, difficult to break with high G forces or chemical treatments alone. Sludges may be found, for example, at the receiving end of the refinery sewers, the American Petroleum Institute (API) separator as API bottoms or as Dissolved Air Flotation (DAF) float, tank bottoms, heat exchanger bundle cleaning sludge, secondary emulsions, spills, slops, and the like.

The "solids slurry" or "solid phase slurried in water" produced by the present invention may be employed as a "coker quench." To be used as a coker quench, the solids slurry should contain a percentage of solids that does not exceed that above which the slurry's viscosity becomes so high as to make it unpumpable, usually around 5 to 35%, or preferably 25% or 20% by weight when the oil percent is around 6% or less by weight If necessary, water is added to the solids to ensure pumpability. The maximum level of oil that may remain in a solids slurry to be used as a coker quench is 8% by weight as measured by toluene extraction. Preferably, the oil content will be less than 4% or less than 2%. The solids slurry to be employed as a coker quench must have undergone attrition of the solid particles in such a way that more than 80% of them have a size less than 100 microns, or preferably, less than 50 microns. The size is important to prevent clogging of the coke pores by large particles and thus depends, to some extent, on the size of the open pores of the coke.

As used herein, the separate oil phase produced contains less than 2% BS&W (bottom sediments and water), preferably less than 1% BS&W and most preferably less than 0.5% BS&W.

As used herein, the separate solid phase produced contains less than 8% oil, preferably less than 4% and most preferably less than 2%.

As indicated in the schematic flow diagram, the process of the present invention is described with a particular emphasis on the treatment of waste products generated in the production field or in the refining of petroleum, but it does not have to be so limited. Other wastes generated by industry and municipal facilities that are mixtures of water, oil and solid materials can be treated similarly. The process is particularly adapted, however, to recycling the waste generated in the refining of crude oil to produce purified oil for reuse, purified water for release and de-oiled solid slurries of solids in water for use as coker quench streams.

The equipment that is necessary to achieve the results claimed here is much simpler and cheaper to operate and to maintain than sophisticated three phase disk and nozzle centrifuges and ancillary equipment described in the prior art, resulting in lower capital investment and significantly reduced maintenance costs.

BRIEF DESCRIPTION OF THE DRAWING

Reference is now made to FIG. 1 for the description of a preferred method for carrying out the process of the present invention.

DEATAILED DESCRIPTION OF THE INVENTION

The refinery waste stream is introduced through line 11 into a cone bottom tank 12 in which it sediments. Free oil and water are decanted out and taken through line 14 to settling tank 21. The concentrated effluent/sludge at the bottom of the cone bottom tank 12 is introduced by line 13 into a ball mill 15. Ball mill 15 has the proper charge of balls both in number and size and grinds the sludge for the proper time to achieve the resolution of the emulsion and achieve simultaneous particle size reduction. Ball mill 15 might optionally be replaced by a less expensive vertical stirring mill or the SRR mill, or similar device.

The resulting sludge is then introduced by line 16 into a separator unit 19, which separates its feed into a liquid phase carried by line 20 into settling tank 21, where it separates into oil that goes back to the refinery by line 22 and water that goes to the refinery Waste Water Treatment Plant (WWTP) by line 24. A small part of that water is carried by line 25 into mixing tank 27 where it is mixed with the effluent of the separator unit 19 entering via line 26 to make the solids pumpable. The resulting aqueous slurry is conveyed by line 28 and pump 29 into the finished slurry tank 30.

In the event the particles take too long to settle under normal gravity, a decanter centrifuge can be used as separator. A demulsifier determined by the lab tests to be the most efficient for that waste stream and/or a flocculent can be added before centrifugation through line 17. An inline mixer 18 insures its proper distribution. In case there is an unacceptable amount of hydrocarbons in mixing tank 27 due to the heavy density of the hydrocarbon (e.g., asphalt), some light oil is introduced by line 17 through the inline mixer 18 into line 16 upstream of the decanter. It dissolves the heavy hydrocarbons and the resulting solution is less dense than water.

Laboratory tests were performed to demonstrate the efficacy of applying shear force to resolve a tight, refinery waste emulsion. These tests were as follows:

EXAMPLE 1

Ball Mill Separation of a First Water in Oil Emulsion

A tightly emulsified water in oil emulsion containing dispersed solids was obtained from a refinery tank bottom. It was divided into three one gallon canisters to test the efficacy of the application of high shear force for the resolution of refinery emulsified waste sludges. 50 ml were taken from the first canister, 50 ml of water were added and thoroughly mixed, and the sample was heated to 180° F. and centrifuged at 500 G for 4 minutes without significant separation of its constituents. This confirmed that it was indeed, a tight emulsion.

Sample 1: In initial tests, aliquots of 50 ml of the first canister's contents were mixed with 50 ml of water plus 1000 ppm of several surfactants, thoroughly mixed, heated to 180° F. and centrifuged at 500 G for 4 minutes. Even with the most efficient surfactant, determined to be Callaway 9884, the centrifuge tube presented a residual rag layer floating between oil and water and a layer of fluffy material below the water and above the more compact solids. Thus the demulsification and centrifugation@ 500 G did not ensure total separation.

Sample 2: The contents of the second canister were submitted to ball milling for one hour. Then an aliquot of 50 ml was taken, mixed with 50 ml of water and 1000 ppm of Callaway 9884, heated to 180° F. and centrifuged as indicated above. This time however, the water was clear and the interfaces between phases were surprisingly well defined. Importantly, there was no trace of a rag layer or of fluffy material above the solids. Thus the demulsification and separation were complete.

Sample 3: The contents of the third canister were mixed with 1000 ppm of Callaway 9884 and submitted to ball milling for one hour. An aliquot of 50 ml was mixed with 50 ml of water heated to 180° F. and centrifuged as above. The results were essentially identical to those obtained with the contents of the second canister, indicating that the addition of a surfactant before or during ball milling, did not improve the resolution of the emulsion.

EXAMPLE 2

Ball Mill Separation of a Second Water in Oil Emulsion

A second water in oil emulsion was tested as above to ensure that the process was applicable to different refinery waste sludges. The second emulsion was also obtained from a refinery tank bottom, but had no inorganic solids. Therefore, road bed dirt and gravel were ball milled to a small particle size, sieved and the fraction between 45 $\mu$m and 1 mm was added to the water in oil emulsion to produce a 20% solids content. The solids were incorporated into the emulsion with a high speed mixer until they were completely dispersed. The emulsion was then divided into samples and treated as above with comparable results.

In conclusion, the high shear forces imparted by ball milling destroy the emulsion with or without the help of the emulsion breaking agents. In contrast, the emulsion was not completely broken with the demulsifier alone. Furthermore, the constituents did not need 500 G to segregate, so while a centrifuge accelerated the sedimentation, it was not essential for the process to work. This is a significant advantage over the prior art, which employ expensive, high speed centrifuges.

What is claimed is:

1. A process for resolving emulsions in waste sludges comprising:
   i) treating a waste sludge having oil, water and solids in an emulsion by applying a shear force to said waste sludge, said shear force being applied by a ball mill and sufficient to break said emulsion; and
   ii) separating said oil, water and solids to produce an oil phase, a water phase and a solid phase.

2. The process of claim 1, whereby said separating is done with a separator selected from the group consisting of a centrifuge, an API separator, an Inclined Plates Separator and a Corrugated Plates Interceptor.

3. The process of claim 1, further comprising dissolving a hydrocarbon that is heavier than water with an oil that reduces the density of the combined oil phase below the density of water.

4. The process of claim 1, further comprising dissolving a salt in the emulsion to increase the density of the water phase.

5. The process of claim 4, whereby said separation is performed with a centrifuge at a G force of less than 4,000.

6. The process of claim 4, whereby said separation is performed with a centrifuge at a G force of less than 1,000.

7. The process of claim 1, whereby said separating is done with a centrifuge.

8. The process of claim 1, whereby
   said oil phase contains less than 2% BS&W, and
   said solid phase contains less than 8% oil.

9. The process of claim 8, further comprising recycling said oil phase.

10. The process of claim 8, further comprising recycling said solid phase in a coker quench stream.

11. The process of claim 1, whereby
said oil phase contains less than 1% BS&W, and
said solid phase contains less than 4% oil.

12. The process of claim 1, whereby
said oil phase contains less than 0.5% BS&W, and
said solid phase contains less than 2% oil.

13. A process for producing a coker quench stream from waste sludge comprising:
 i) treating a waste sludge having oil, water and solids in an emulsion by applying a shearing force to said waste sludge to break said emulsion, said shearing force being applied by a ball mill;
 ii) separating said oil, water and solids into an oil phase, a water phase and a solid phase; and
 iii) using said solid phase slurried in water as coker quench stream.

14. The process of claim 13, wherein said oil comprises a hydrocarbon that is heavier than water and said process further comprises dissolving said hydrocarbon with an oil that reduces the density of the combined oil phase below the density of water.

15. The process of claim 13, further comprising dissolving a salt in the emulsion to increase the density of the water phase.

16. The process of claim 13, whereby said shearing causes attrition of the particles of said solids so that 80% of the particles are smaller than 100 microns.

17. The process of claim 13, whereby said shearing causes attrition of the particles of said solids so that 80% of the particles are smaller than 50 microns.

18. The process of claim 13, whereby said separating is done with a separator selected from the group consisting of a centrifuge, an API separator, an Inclined Plates Separator, and a Corrugated Plates Interceptor.

19. The process of claim 13, whereby said separating is done with a centrifuge at a G force of less than 4,000.

20. The process of claim 13, whereby said separating is done with a centrifuge at a G force of less than 1,000.

21. The process of claim 13, whereby
said separate oil phase contains less than 2% BS&W, and
said separate solid phase contains less than 8% oil.

22. The process of claim 21, further comprising recycling said oil phase.

23. The process of claim 13, whereby
said separate oil phase contains less than 1% BS&W, and
said separate solid phase contains less than 4% oil.

24. In a process for producing a delayed petroleum coke, wherein a coker quench stream is introduced into a delayed coking vessel during quenching, the improvement comprising:
 a) treating a waste stream containing an emulsion of water, oil and solids by applying a shear force, said shear force being sufficient to resolve said emulsion and being applied by a ball mill;
 b) separating said resolved emulsion into a separate water phase, a separate oil phase containing less than 2% BS&W and a separate solid phase containing less than 8% oil;
 c) diluting said solid phase to be a coker quench stream having less than 25% solids; and
 d) introducing said coker quench stream into a delayed coking vessel during quenching.

25. The process of claim 24, wherein said oil comprises a hydrocarbon that is heavier than water and said process further comprises dissolving said hydrocarbon with an oil that reduces the density of the combined oil phase below the density of water to cause said hydrocarbon to float.

26. The process of claim 24, further comprising dissolving a salt in the emulsion to increase the density of the water phase.

27. The process of claim 24, whereby said separating is done with a separator selected from the group consisting of a centrifuge, an API separator, an Inclined Plates Separator, and a Corrugated Plates Interceptor.

28. The process of claim 24, whereby said separating is done with a centrifuge at a G force of less than 4,000.

29. The process of claim 24, whereby said separating is done with a centrifuge at a G force of less than 1,000.

30. The process of claim 24, whereby said shear force causes attrition of the particles of said solids so that 80% of the particles are smaller than 100 microns.

31. The process of claim 24, whereby said shear force causes attrition of the particles of said solids so that 80% of the particles are smaller than 50 microns.

32. A process for resolving emulsions in waste sludges, comprising the steps of:
 treating a waste sludge having oil, water, and solids in an emulsion by applying a shear force to the waste sludge, the shear force being sufficient to break said emulsion and being applied by a grinding device; and
 separating said oil, water, and solids to produce an oil phase, a water phase and a solid phase.

33. The process of claim 32, wherein the grinding is selected from the group consisting of a ball mill, roller mill, hammer mill, disk attrition mill, pebble mill, double cage disintegrator, vertical stirring mill, and vibrator mill.

* * * * *